K. R. PETERS.
SMOOTHING TOOL.
APPLICATION FILED JUNE 19, 1920.

1,374,604.

Patented Apr. 12, 1921.

INVENTOR
Karl R. Peters.

WITNESS

ATTORNEYS

UNITED STATES PATENT OFFICE.

KARL R. PETERS, OF PHILADELPHIA, PENNSYLVANIA.

SMOOTHING-TOOL.

1,374,604.　　　　Specification of Letters Patent.　　Patented Apr. 12, 1921.

Application filed June 19, 1920. Serial No. 390,282.

*To all whom it may concern:*

Be it known that I, KARL R. PETERS, a citizen of the United States, and a resident of the city of Philadelphia, in the county of Philadelphia, State of Pennsylvania, have invented certain new and useful Improvements in Smoothing-Tools, of which the following is a specification, reference being had to the accompanying drawing.

My invention relates to a tool adapted to be used in connection with the repairing of cylinders in gas engines and more particularly for use in smoothing or working upon the material used in repairing a cylinder whereby the surface of the material may have the same form as the repaired surface of the cylinder.

Among the objects of the invention is to provide a new and useful tool of the character above mentioned having means for adjusting the tool to adapt its use with different size cylinders and upon surfaces of different curvature.

Another object of the invention is to provide a tool with guide means whereby the operative part of the tool will smooth the material used in repairing scored cylinders without depressing the surface of the repairing material below points lying in the curved surface continued or projected of the cylinder, but to compress and pack the repairing composition in place while at the same time rejecting the superfluous portions thereof.

Other objects and advantages will more fully appear hereinafter.

Figure 1:
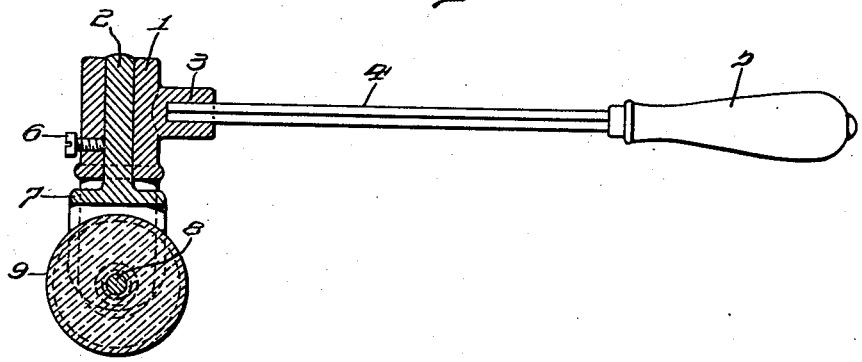
Figure 2:
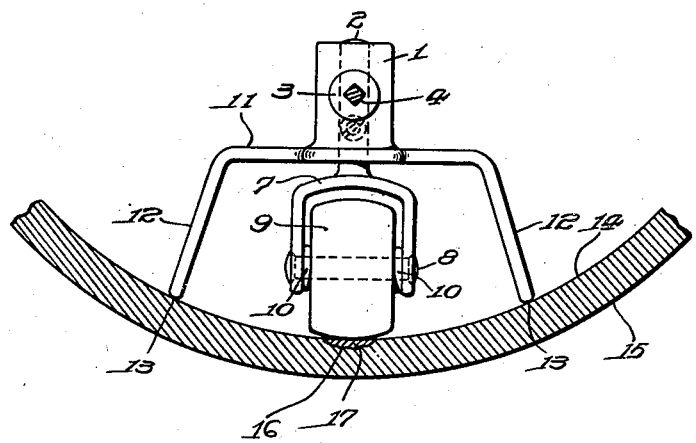

Referring to the drawing, Figure 1 is a view, partly in section and partly in elevation, of one form of tool constructed in accordance with my invention and Fig. 2 is an end view of the tool showing the latter in operative position within a cylinder.

Referring more particularly to the drawing, I have shown thereon one form of tool, constructed in accordance with the invention, comprising a hub 1 centrally bored to receive the stem 2 of a roller supporting member and provided with a laterally extending socket 3 to which is rigidly connected an end of a rod 4, the other end of the rod 4 being provided with a handle 5. The stem 2 is preferably cylindrical in form and is adapted to slide, as well as rotate, in the central aperture of the hub 1 for the purpose of adjustment thereof relative to said hub. A set screw 6 may be threaded into the hub 1 into engagement with the stem 2 for the purpose of securing the stem 2 in any of its adjusted positions.

The lower end of the stem 2 is provided with a strap member 7, of generally U shape, to the free ends of which is connected a bearing pin 8 suitably headed in the strap member to maintain the same in rigid position. Upon the pin 8 is rotatably supported a roller 9, preferably made of refractory or vitreous material, such as glass, porcelain and the like, this roller being provided with a convex surface or periphery. Between the arms of the strap 7 and the lateral faces of the roller 9 may be provided thrust washers 10 surrounding the pin 8 for the purpose of maintaining the roller 9 in proper central relation.

The lower end of the hub 1 is provided with a guide member 11 preferably formed integral therewith and provided with a pair of fingers 12 with rounded ends 13 adapted to contact with the inner surface 14 of a cylinder wall 15.

When repairing a scored cylinder, the scored cavity 16 is cleansed and scraped, and then treated with a suitable flux, after which a suitable metallic composition 17 for filling the score may be inserted or packed thereinto. It is usual to employ such composition when in a molten or plastic condition and to then run a scraper along the surface of the cylinder in a way so that the same will remove surplus material projecting above the surface of the cylinder. In doing this, the scraping tool is usually applied with some pressure and will, due to that pressure, press into the composition and the finished surface thereof will not be a smooth continuation of the surface of the cylinder, but will be depressed below the same. If, on the other hand, the workman attempts to avoid this by applying less pressure, a result is effected wherein the surface of the composition will protrude beyond or above the surface of the cylinder.

It is therefore an object of my invention to provide a tool which will mechanically operate as nearly theoretically perfectly as a mechanical means may operate upon the repairing composition to effect a smooth surface of the same curvature as that of the cylinder and become an unbroken continuation thereof, irrespective of the amount of pressure that may be applied to the tool during the smoothing operation. I accomplish the above results by making the tool of a structure as above described, so that the point of contact between the roller and the finished surface of the repairing composition and the points of contact between the ends 13 and the cylinder surface 14, being three in number, will be those that conform to the curvature of the surface of the cylinder, or, to express it in other words, said three points of contact lie in the same circle of said surface. When making use of the tool, I loosen the set screw 6, place the fingers 12 in contact with the cylinder and move the roller 9, as well as the stem 2 longitudinally of the hub 1, to a position where the roller 9 also will contact with the surface of the cylinder, thereby adjusting the parts so that the points of contact will lie in the circle of the interior surface of the cylinder, and then I set the screw 6 to maintain the parts in fixed relation. I then move the tool over opposite the cavity 16 in which the plastic material 17 is placed and the tool is moved to and fro longitudinally of the cylinder, while maintaining the fingers 12 in contact with the cylinder wall, so that the roller 9, at its periphery, will contact with the plastic material and squeeze or press the same into the cavity so that the excess thereof will be caused to move or flow laterally over the edges of the cavity, the tool being worked gradually from one side to the other so that each time the roller is caused to pass over the repairing material, it will not be in exactly the same spot or line previously operated upon. It will be observed that as the periphery of the roller operates near the edges of the cavity, whatever excess material has been forced therefrom will be so compressed that the same will be practically sheared at the edge of the cavity, leaving the surface of the material in the cavity smooth and having a curved surface exactly the same as the surface of the cylinder. It will be observed further, that by reason of the relative position of the roller and the fingers 12, the latter being constantly in contact with the surface of the cylinder, the periphery of the roller 9 will never operate above or below the surface continuation of said cylinder, so that the roller will not cause a depression in the repairing composition in the cavity but its point of contact will also be coincident with the surface continuation of said cylinder.

The tool is adjustable for the purpose of adapting it to different sized cylinders so that for cylinders of smaller diameter than that shown upon the drawing, the roller may be adjusted to protrude at a greater distance from the hub 1 in order that its point of contact will lie in the same surface as the points of contact between the fingers and said surface.

It has been found by experimentation that a roller made of refractory material, particularly glass, is efficacious by not adhering to the repairing material. I prefer that the roller shall be made of glass or the like with a polished surface so that the same will give a properly formed smooth and polished surface to the repairing material, avoiding any necessity of burnishing or otherwise polishing the same, as in the old processes.

While I have herein described and illustrated upon the accompanying drawing one form or embodiment of the invention it is to be understood, however, that the same is not limited to the particular details and arrangement of parts disclosed and shown but that said invention comprehends other forms and arrangements of parts as do not depart from the spirit of the invention and the scope of the appended claims.

Having thus described my invention, I claim and desire to protect by Letters Patent of the United States:

1. In a tool adapted for use in repairing cylinder walls of engines, the combination of a hub provided with a bore, a roller adapted to operate upon the portion of the cylinder undergoing repair, means for supporting said roller in rotatable position, said means adjustably connected to said hub, guide means on said hub adapted to contact said cylinder at two points, the contact point of said roller and the contact points of said guide means lying in the circle of curvature of the surface of the cylinder and a handle connected to said hub.

2. In a tool adapted for use in repairing cylinder walls of engines, the combination of means for compressing and packing repairing material in place in the cylinder wall, means for adjustably supporting said first mentioned means in operative position, means connected to said supporting means and provided with guide members adapted to contact with the surface of the cylinder wall at independent points, said first mentioned means being adjustable to contact at another point whereby said points of contact lie in the circle of curvature of said surface and a handle on said supporting means.

3. In a tool adapted for use in repairing cylinder walls of engines, the combination of a roller adapted to pack and compress repairing material applied to said wall, means for rotatably supporting said roller, a shank on said means, a hub for adjustably receiving said shank, means for securing said shank in adjusted position relative to said hub, guide fingers on said hub adapted to contact the surface of said wall at independent points, said roller contacting said surface at another point whereby said points of contact lie in the circle of curvature of said surface and a handle connected to said hub.

4. In a tool adapted for use in repairing cylinder walls of engines, the combination of a roller of refractory material, means for adjustably supporting said roller, and guide means connected to said supporting means and adapted to be guided over the surface of the cylinder wall for maintaining said roller in such relation thereto that the points of contact of said roller and said guiding means will lie in the circle of curvature of said surface.

5. In a tool adapted for use in repairing cylinder walls of engines, the combination of a roller of glass, means for adjustably supporting said roller, and guide means connected to said supporting means and adapted to be guided over the surface of the cylinder wall for maintaining said roller in such relation thereto that the points of contact of said roller and said guiding means will be in the circle of curvature of said surface, and means connected to said supporting means for manual operation.

In witness whereof, I have hereunto set my hand this 18th day of June, A. D. 1920.

KARL R. PETERS.